(12) United States Patent
De Natale et al.

(10) Patent No.: US 10,944,333 B2
(45) Date of Patent: Mar. 9, 2021

(54) POWER SUPPLY UNIT FOR A SELF-POWERED INTELLIGENT ELECTRONIC DEVICE

(71) Applicant: ABB Schweiz AG, Baden (CH)

(72) Inventors: Gabriele Valentino De Natale, Milan (IT); Luciano Di Maio, Milan (IT); Massimiliano Villano, Dalmine (IT)

(73) Assignee: ABB Schweiz AG, Baden (CH)

( * ) Notice: Subject to any disclaimer, the term of this patent is extended or adjusted under 35 U.S.C. 154(b) by 193 days.

(21) Appl. No.: 15/524,494

(22) PCT Filed: Oct. 20, 2015

(86) PCT No.: PCT/EP2015/074228
§ 371 (c)(1),
(2) Date: May 4, 2017

(87) PCT Pub. No.: WO2016/071102
PCT Pub. Date: May 12, 2016

(65) Prior Publication Data
US 2017/0324271 A1    Nov. 9, 2017

(30) Foreign Application Priority Data
Nov. 4, 2014    (EP) .................................... 14191594

(51) Int. Cl.
*H02M 7/02* (2006.01)
*H02J 9/06* (2006.01)
(Continued)

(52) U.S. Cl.
CPC .............. *H02M 7/02* (2013.01); *H02J 7/025* (2013.01); *H02J 9/06* (2013.01); *H02J 9/061* (2013.01);
(Continued)

(58) Field of Classification Search
CPC ............. H02M 3/22; H02M 7/02; H02M 7/30
(Continued)

(56) References Cited

U.S. PATENT DOCUMENTS

| 4,804,922 A * | 2/1989 | Sometani | G01R 19/155 |
| | | | 324/108 |
| 6,856,103 B1 * | 2/2005 | Hudson | H05B 39/02 |
| | | | 315/200 R |

(Continued)

FOREIGN PATENT DOCUMENTS

| EP | 2365507 A1 | 9/2011 |
| JP | 2010246204 A * | 10/2010 |
| WO | 2014019623 A1 | 2/2014 |

OTHER PUBLICATIONS

International Search Report and Written Opinion for PCT International Application Serial No. PCT/EP2015/074228, completed Dec. 7, 2015, 11 pages.

*Primary Examiner* — Adi Amrany
(74) *Attorney, Agent, or Firm* — Taft Stettinius & Hollister LLP

(57) ABSTRACT

A power supply unit for an IED for LV or MV electric power applications characterized in that it comprises: a power transformer stage, which is operatively coupled to a feeding conductor to harvest electric power from said feeding conductor; a first storage stage, which is electrically connected to said power transformer stage to store electric energy; a first step-down conversion stage, which is electrically connectable/disconnectable to/from said first storage stage; a switching stage adapted to electrically connect/disconnect said first step-down conversion stage with/from said first storage stage; and a second storage stage, which is electrically connected to said first step-down conversion stage to store electric energy.

20 Claims, 9 Drawing Sheets

Figure 1:
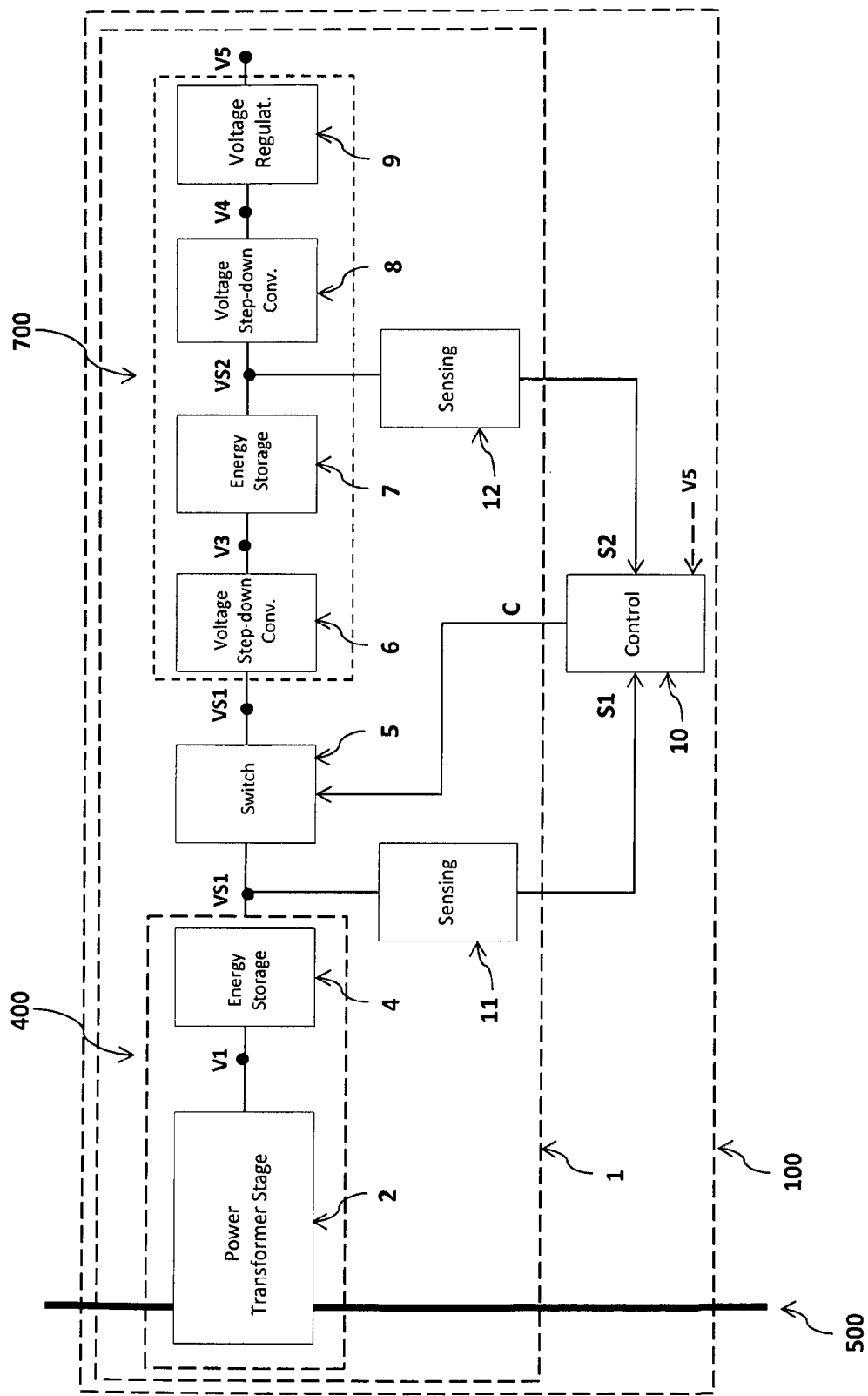

(51) Int. Cl.
*H02J 13/00* (2006.01)
*H02J 7/02* (2016.01)
*H02J 50/10* (2016.01)
*H02M 3/22* (2006.01)
*H02M 7/30* (2006.01)

(52) U.S. Cl.
CPC .......... *H02J 13/0006* (2013.01); *H02J 50/10* (2016.02); *H02M 3/22* (2013.01); *H02M 7/30* (2013.01); *Y02B 70/30* (2013.01); *Y02B 90/20* (2013.01); *Y02E 60/00* (2013.01); *Y04S 10/18* (2013.01); *Y04S 20/12* (2013.01); *Y04S 20/248* (2013.01)

(58) Field of Classification Search
USPC .................................................. 307/65, 125
See application file for complete search history.

(56) References Cited

U.S. PATENT DOCUMENTS

| | | | | |
|---|---|---|---|---|
| 9,449,774 | B2* | 9/2016 | De Natale | H01H 47/002 |
| 2002/0130645 | A1* | 9/2002 | Tsai | H02M 3/158 |
| | | | | 323/274 |
| 2003/0137786 | A1* | 7/2003 | Hasegawa | H02H 9/001 |
| | | | | 361/10 |
| 2007/0122170 | A1* | 5/2007 | Mashiba | G03G 15/2039 |
| | | | | 399/33 |
| 2008/0050139 | A1* | 2/2008 | Nakajima | G03G 15/2039 |
| | | | | 399/69 |
| 2008/0077336 | A1* | 3/2008 | Fernandes | G01R 15/142 |
| | | | | 702/57 |
| 2008/0122418 | A1* | 5/2008 | Briere | H02M 3/1588 |
| | | | | 323/282 |
| 2011/0080156 | A1* | 4/2011 | Briere | H02M 3/1588 |
| | | | | 323/351 |
| 2012/0001612 | A1* | 1/2012 | Cuk | H02M 3/005 |
| | | | | 323/311 |
| 2012/0319476 | A1* | 12/2012 | De Natale | H01H 47/002 |
| | | | | 307/19 |
| 2013/0297840 | A1* | 11/2013 | Kagan | G06F 13/12 |
| | | | | 710/69 |
| 2013/0328537 | A1* | 12/2013 | Doorn | H02M 3/156 |
| | | | | 323/271 |
| 2014/0062449 | A1* | 3/2014 | Qu | G05F 3/02 |
| | | | | 323/311 |
| 2015/0200532 | A1* | 7/2015 | De Natale | H02H 1/063 |
| | | | | 363/44 |
| 2015/0288175 | A1* | 10/2015 | May | G01R 1/36 |
| | | | | 361/52 |
| 2015/0338446 | A1* | 11/2015 | Zhu | G01R 21/133 |
| | | | | 702/61 |

* cited by examiner

POWER SUPPLY UNIT FOR A SELF-POWERED INTELLIGENT ELECTRONIC DEVICE

The present invention relates the field of electric power equipment for low or medium voltage electric power distribution networks.

More particularly, the present invention relates to a power supply unit for a self-powered intelligent electronic device for low or medium voltage electric power applications.

For the purposes of the present application, the term "low voltage" (LV) relates to voltages lower than 1 kV AC and 1.5 kV DC whereas the term "medium voltage" (MV) relates to voltages higher than 1 kV AC and 1.5 kV DC and lower than 72 kV AC and 100 kV DC.

As is known, the term "Intelligent Electronic Device" (IED) identifies an electronic microcontroller-based device for managing operation of electric power equipment, such as a circuit breaker, disconnector, sectionalizer, contactor, recloser, and the like.

IEDs typically adopt digital processing devices to perform protective functions, control functions, monitoring functions and communication functions.

Common types of IEDs include protective relays, switching device controllers, monitoring devices, voltage regulators, and the like.

As is known, some IEDs are "self-powered", i.e. they are provided with a power supply unit capable to harvest electric power directly from a feeding conductor (normally a phase conductor of an electric power distribution line), to which the IED or the apparatus including the IED is operatively associated.

Normally, the power supply unit of a self-powered IED incorporates storage capacitors to feed the internal components of the IED, e.g. the control unit of the IED.

In normal conditions, these storage capacitors are continuously charged by the electric power harvested from the feeding conductor and are in turn capable to continuously feed the IED.

When a very small current or no current flows along the main conductor (e.g. due to fault conditions), the storage capacitors are no more charged and they are thus capable to provide electric power for a residual time interval only, after which the stored electric energy is fully dissipated and the IED cannot operate anymore.

As is known, it is important that such a residual time interval is sufficiently long to allow the IED to properly manage in time the occurring emergency conditions.

A traditional solution to face this issue consists in providing the power supply unit with huge storage capacitors, which require a relatively long time for being discharged.

Unfortunately, this approach entails a remarkable increase of the overall size and production costs of the power supply unit.

It is an object of the present invention to provide a power supply unit for an IED for low or medium voltage applications that solves the above-mentioned problems.

More in particular, it is an object of the present invention to provide a power supply unit, which allows an IED to safely operate for a sufficiently long interval of time, when electric power harvesting from a primary conductor is no more available.

Yet another object of the present invention is to provide a power supply unit, which has a smaller size and higher efficiency in comparison with commonly available solutions.

Another object of the present invention is to provide a power supply unit, which can be easily manufactured at competitive costs.

The present invention thus provides a power supply unit for an IED for low or medium voltage electric power applications, according to the following claim 1 and the related dependent claims.

In a further aspect, the present invention concerns an IED for low or medium voltage electric power applications, according to the following claim 14.

Characteristics and advantages of the invention will emerge from the description of preferred, but not exclusive, embodiments of the power and control unit for a low or medium voltage apparatus, according to the invention, non-limiting examples of which are provided in the attached drawings, wherein:

FIG. 1 is a block scheme of an embodiment of the power supply unit, according to the invention; and FIGS. 2-9 are block schemes of parts of the power supply unit of FIG. 1.

Referring to the cited figures, the present invention relates to a power supply unit 1 for an IED 100 for low or medium voltage applications.

The IED 100 may be operatively associated with or comprised in the electric power equipment of a MV or LV electric power distribution network, such as in a circuit breaker, a contactor, a disconnector, a sectionalizer, and the like.

As an example, the IED 100 may be the control module of a switching device or sectionalizer installed on an overhead electric power distribution line.

The IED 100 (partially shown in FIG. 1) preferably comprises a control unit 10, which manages the operation of the IED itself and/or the operation of the electric power equipment including the IED.

For example, the control unit 10 may manage internal and external diagnostic activities, control the operation of the electric power equipment by means of appropriate algorithms, provide/receive control commands, communicate with external or internal devices and perform other activities requested during the operating life of the electric power equipment.

Preferably, the control unit 10 is provided with one or more main digital processing devices (e.g. one or more microprocessors).

The IED 100 is of self-powered type. The power supply unit 1 is thus capable to draw electric power directly from a feeding conductor 500 operatively associated with the IED or the electric power equipment.

As an example, the feeding conductor 500 may be a phase conductor of an electric power distribution line, on which the electric power equipment (e.g. a switching device or sectionalizer) is installed.

The power supply unit 1 comprises a plurality of electronic stages that are electrically connected in cascade.

In particular, the power supply unit 1 comprises a harvesting section 400, which is configured to efficiently draw electric power from the feeding conductor 500 and store electric energy at high voltages.

According to the invention, the power supply unit 1 comprises a power transformer stage 2 operatively coupled to the feeding conductor 500 to harvest electric power from this latter (FIG. 1).

The power transformer stage 2 comprises output terminals 20, at which it provides a first voltage V1 (preferably a DC voltage), when a current flow along the feeding conductor 500.

Figure 2:
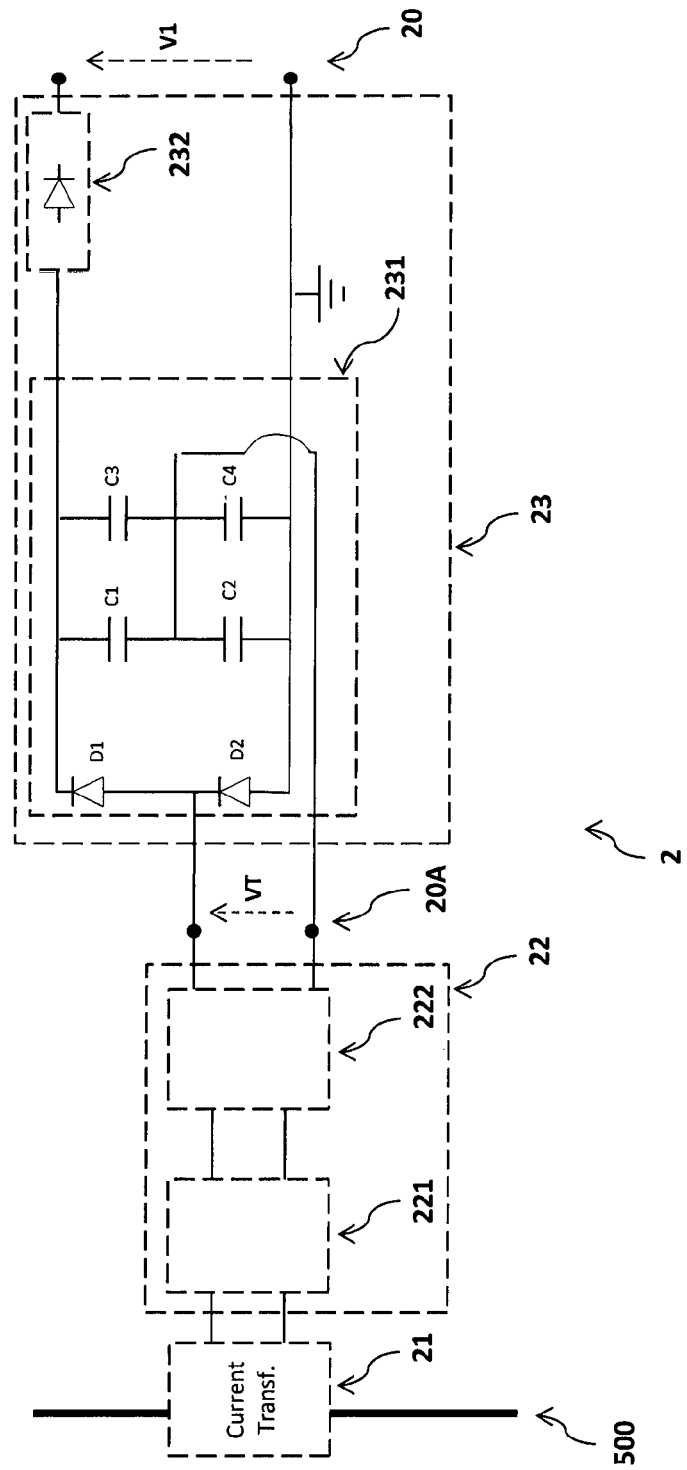
Figure 3:
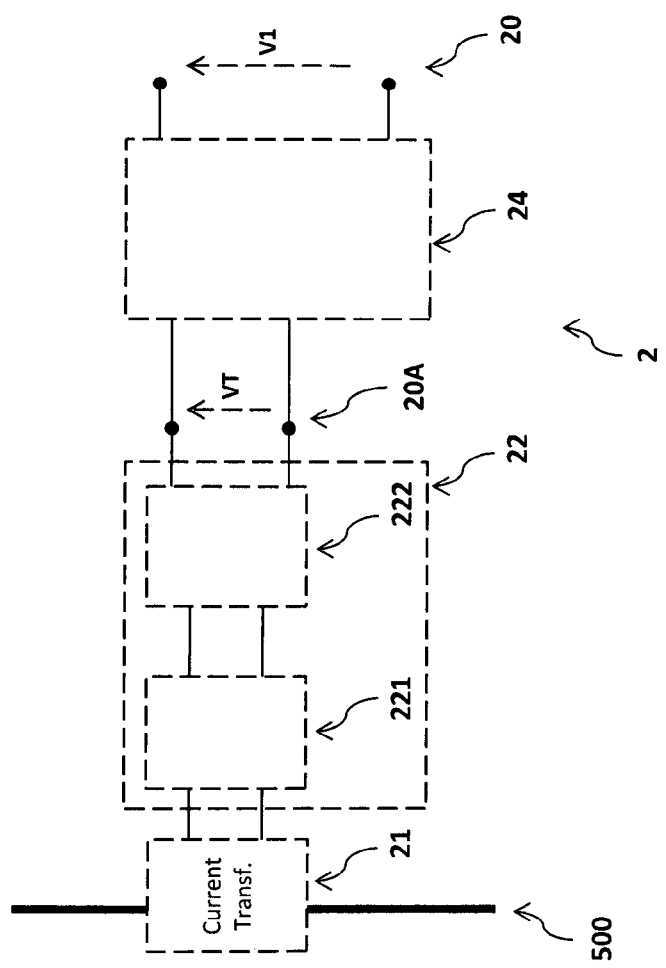
Figure 4:
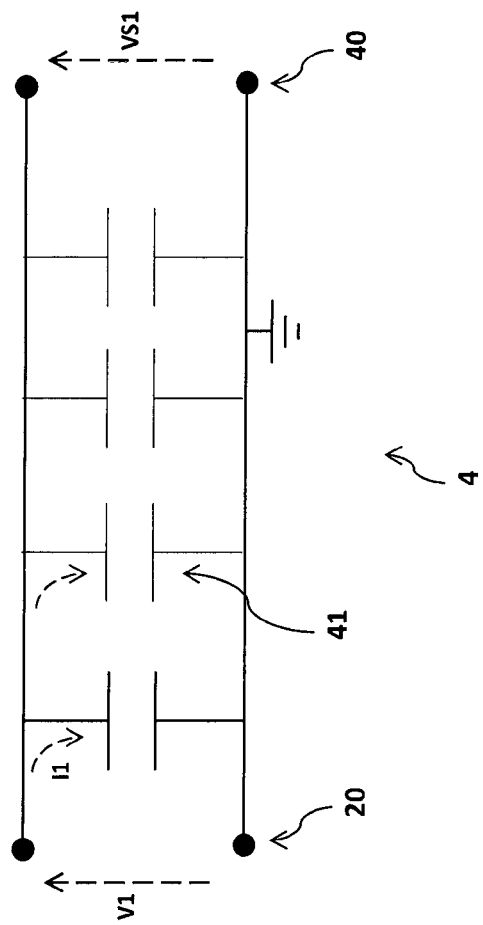

Referring to FIGS. 2-3, the power transformer stage 2 preferably comprises a current transformer 21 operatively coupled to the feeding conductor 500.

When a current flows along the feeding conductor 500, the current transformer 21 provides an output current (as an equivalent current generator). In this way, the voltage provided at its output terminals basically depends on the downstream equivalent load seen from these latter, the current flowing in the feeding conductor 500 and the characteristic of the current transformer 21.

According to an embodiment of the invention (FIG. 2), the power transformer stage 2 preferably comprises a voltage limiting circuit 22 electrically connected to the current transformer 21 and a step-up circuit 23 electrically connected to the voltage limiting circuit 22.

The voltage limiting circuit 22 has output terminals 20A and provides in output an intermediate voltage VT (preferably an AC voltage).

The voltage limiting circuit 22 is configured to provide protection against voltage pulses, which may derive from sudden decreases of the equivalent load seen from the output terminals 20A or sudden increases of the current flowing along the feeding conductor 500.

In this way, the intermediate voltage VT is always within a safety range (e.g. about 44V of peak amplitude in normal conditions).

Preferably, the voltage limiting circuit 22 comprises a voltage clipping section 221 and a voltage regulation section 222, which are electrically connected in cascade between the output terminals of the current transformer 21 and the output terminals 20A.

Advantageously, the voltage clipping section 221 may include Zener diodes or TVS (Transient Voltage Suppressors) devices suitably arranged to provide voltage clipping functions at the output terminals of the current transformer 21 whereas the voltage regulation section 222 may include a TRIAC (Triode for Alternating Current) or SCR (Silicon Controlled Rectifier) switching circuit, suitably arranged to regulate the output voltage VT at the output terminals 20A of the voltage limiting circuit 22.

The step-up circuit 23 is adapted to receive the intermediate voltage VT and provide, at the output terminals 20, the first voltage V1 having a higher amplitude (e.g. about 88V in normal conditions) than the intermediate voltage VT.

Referring to FIG. 2, the step-up circuit 23 preferably comprises a voltage doubler circuit 231 electrically connected with the output terminals 20A of the voltage limiting circuit 22.

The voltage doubler circuit 231 is configured to step-up and rectify the intermediate voltage VT provided by the voltage limiting circuit 22.

In particular, the voltage doubler circuit 31 is configured to receive the AC voltage VT and provide in output the DC voltage V1 having an amplitude higher than the amplitude of the voltage VT.

Preferably, the amplitude of the voltage V1 is about twice the peak amplitude of the voltage VT.

Advantageously, the voltage doubler circuit 231 comprises a network of diodes D1, D2 and capacitors C1, C2, C3, C4 that are arranged between the terminals 20A, 20 according to a bridge-like configuration.

When the AC voltage V1 at the output terminals 20A is positive (positive half-wave), the diode D1 is in a conduction state (ON state) whereas the diode D2 is in an interdiction state (OFF state). The capacitors C1, C3 are charged at a voltage $VT_{MAX}$, where is the peak amplitude of the voltage VT.

When the AC voltage VT at the output terminals 20A is negative (negative half-wave), the diode D2 is in an ON state whereas the diode D1 is in an OFF state. The capacitors C2, C4 are charged at a voltage $-VT_{MAX}$.

As a result, a rectified DC voltage V1, which has an amplitude substantially corresponding to the peak-to-peak amplitude of the AC voltage VT (i.e. $V1=2VT_{MAX}$), is provided at the output terminals 20 of the power transformer stage 2.

Advantageously, the capacitors C1, C2 (preferably of the electrolytic type) are selected to mainly provide electric energy storage functions whereas the capacitors C3, C4 (preferably of the ceramic type) are selected to mainly provide suitable filter functions of high-frequency components of the voltage VT.

Referring to FIG. 2, the step-up circuit 23 preferably comprises a first blocking circuit 232 to prevent the circulation of a discharging current from the output terminals 20 towards the voltage doubler circuit 231 due to the presence of possible capacitive load unbalances with the downstream electronic stages (in particular with the electronic stage 4 described in the following).

Preferably, the blocking circuit 232 comprises one or more diodes suitably configured to block such a discharging current.

According to an alternative embodiment of the invention (FIG. 3), the current transformer 21 and the voltage limiting circuit 22 are arranged so that the intermediate voltage VT provided at the output terminals 20A of the voltage limiting circuit 22 is sufficiently high (e.g. about 88V of peak amplitude in normal conditions).

To this aim the current transformer 21 may comprise a sufficiently high number of turns at its secondary winding whereas the voltage clipping section 221 and the voltage regulation section 222 of the voltage limiting circuit 22 may be properly configured to provide a sufficiently high AC voltage VT at the terminals 20A.

In this second embodiment, the power transformer stage preferably comprises a rectification circuit 24 that is electrically connected between the terminals 20A, 20.

The rectification circuit 24 is configured to rectify the AC voltage VT. To this aim, it may comprise a plurality of diodes in a bridge-like configuration.

As a result, a rectified DC voltage V1, which has an amplitude substantially corresponding to the peak amplitude of the AC voltage VT (i.e. $V1=VT_{MAX}$) is provided at the output terminals 20 of the power transformer stage 2.

According to the invention, the power supply unit 1 comprises a first storage stage 4 electrically connected with the output terminals 20 of the power transformer stage 2.

The storage stage 4 comprises first supply terminals 40, at which the storage stage 4 provides a first supply voltage VS1.

The storage stage 4 is advantageously configured to store electric energy. To this aim, it advantageously comprises first storage capacitors 41 (preferably of the electrolytic type) electrically connected in parallel to the terminals 20, 40.

The power transformer stage 2 provides a first charging current I1 to the storage stage 4 to charge the storage capacitors 41, when a current flows along the feeding conductor 500.

When at least a minimum given current flows along the feeding conductor 500, the storage stage 4 is maintained charged by the power transformer stage 2 and the supply voltage VS1 at the supply terminals 40 is substantially equal to the voltage V1 provided by the power transformer stage 2.

When no currents or no sufficient currents flow along the feeding conductor 500, the power transformer stage 2 is no more capable of maintaining the storage stage 4 in a charged condition. The supply voltage VS1 at the supply terminals 40 decreases, as the storage stage 4 progressively discharges.

Figure 9:
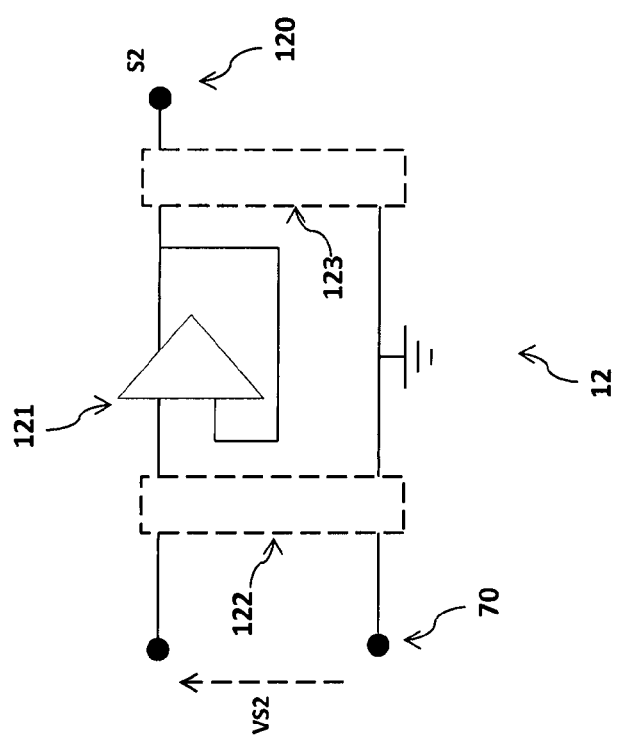

According to a preferred embodiment of the invention, the power supply unit 1 comprises a first sensing circuit 11, which is electrically connected to the storage stage 4 (FIG. 9).

The sensing circuit 11 is advantageously adapted to provide first sensing signals S1 indicative of the supply voltage VS1 at the supply terminals 40.

Preferably, the sensing signals S1 are provided in input to a control unit 10, which may process them for monitoring purposes. Preferably, the control unit 10 is the control unit of the IED 100.

Preferably, the sensing circuit 11 comprises a first operational amplifier 111 and first conditioning circuits 112, 113 to set the operational amplifier 111 in a voltage-follower configuration that provides a high-impedance decoupling between the terminals 40 and the output terminal 110 of the sensing circuit 11, at which the sensing signal S1 is made available.

The electronic stages 2, 4, (and possibly 11) described above, form the harvesting section 400 of the power supply unit 1, which is aimed at efficiently harvesting and store the electric power made available by the feeding conductor 500.

When a current flows in the feeding conductor 500, the power transformer stage 2 is capable to provide a given output voltage V1, thereby performing a conversion of the energy made available by the feeding conductor 500.

Advantageously, the voltage V1 is relatively high, so that the storage capacitors 41 can be maintained in a charged condition even when relatively small currents flow along the feeding conductor 500.

This allows remarkably reducing the minimum current that has to flow along the feeding conductor 500 to harvest electric power from this latter.

As a consequence, a current transformer 21 having a smaller size may be used to draw a given amount of electric power from the feeding conductor 500.

The first storage stage 4 forms a high voltage energy reservoir (in this case the term "high voltage" has to be intended with respect to the feed voltages normally feeding the IED 100) that is normally kept in a fully charged state.

Such an energy reservoir is discharged to provide electric power to the downstream electronic stages 6, 7, 8, 9 only when no electric power can be usefully harvested from the feeding conductor 500.

The electronic stage 4 is thus capable to make available a relatively high amount of electric energy when no electric power is otherwise available, thereby ensuring a relatively long feeding time to the downstream electronic stages in emergency conditions.

The power supply unit comprises a feeding section 700, which is electrically connectable/disconnectable to/from the harvesting section 400.

The feeding section 700 is configured to efficiently provide one or more feeding voltages to the IED 100, in particular to the control unit 10 of this latter.

According to the invention, the power supply unit 1 comprises a first step-down conversion stage 6 electrically connectable/disconnectable to/from the storage stage 4.

When it is electrically connected with the storage stage 4, the conversion stage 6 is adapted to receive the supply voltage VS1 and provide at its output terminals 60 a third voltage V3 (preferably a DC voltage) having a lower amplitude than the voltage VS1.

Preferably, the conversion stage 6 comprises a first DC/DC switching converter advantageously configured to convert the voltage VS1 into the remarkably lower voltage V3 (e.g. about 11V in normal conditions).

Preferably, the first switching converter is a buck converter.

Preferably, the first switching converter is a buck converter with synchronous rectification, so as to ensure a more efficient voltage conversion and a lower heat dissipation.

According to the invention, the power supply unit 1 comprises a switching stage 5 that is adapted to electrically connect/disconnect the conversion stage 6 with/from the storage stage 4.

The switching stage 5 is electrically connected to the supply terminals 40 of the storage stage 4, from which it receives the supply voltage VS1.

The output terminals 50 of the switching stage 5 are electrically connected to the conversion stage 6.

When the switching stage 5 is commanded to electrically connect the first step-down conversion stage 6 with the storage stage 4, the switching stage 5 provides the supply voltage VS1 at its output terminals 50. The voltage VS1 can thus be received in input by the conversion stage 6, in particular by the switching converter 66.

Preferably, the switching stage 5 is adapted to receive control signals C.

Preferably, the control signals C are provided by a control unit 10 to control the switching operation of the switching stage 5. Preferably, the control unit 10 is the control unit of the IED 100.

Preferably, the switching stage 5 comprises at least a switching device 51 that is electrically connected between the terminals 40, 50.

When it is in a conduction/interdiction (ON/OFF) state, the switching device 51 electrically connects/disconnects the conversion stage 6 with/from the storage stage 4.

Preferably, the switching stage 5 comprises a driving circuit 52 to drive the switching device 51. Advantageously, the driving circuit 52 is adapted to receive the control signals C and enable/disable the switching operation of the switching device 51 in response to the control signals C.

The switching device 51 has advantageously to ensure electrical connection between the conversion stage 6 and the storage stage 4, if it is not actively controlled by the control unit 10.

Further, the switching device 51 has advantageously to naturally switch in an ON state, if the control signals C are no more available.

In other words, the switching device 51 has to be in a conduction state (ON state) if the control signals C are not available for some reasons, e.g. during the start-up of the IED 100.

To this aim, the switching device 51 is preferably a MOSFET transistor of the depletion type. Further, the adoption of a depletion MOSFET allows reducing power consumption as depletion MOSFETs can be conveniently controlled through the gate contact with a polarisation network that does not draws power from the inputs terminals 40. Other types of switching device (e.g. MOSFET of the enhancement type) would in fact require a polarisation network that consumes power also when in the device is in the OFF state.

Preferably, when a depletion MOSFET is used for the switching device 51, the switching stage 5 comprises a second blocking circuit 53 to prevent the circulation of a discharging current coming from the downstream electronic stages.

Preferably, the blocking circuit 53 comprises one or more diodes suitably configured to block such a discharging current.

According to the invention, the power supply unit 1 comprises a second storage stage 7 electrically connected with the output terminals 60 of the conversion stage 6.

The storage stage 7 comprises second supply terminals 70, at which it provides a second supply voltage VS2.

The storage stage 7 is advantageously configured to store electric energy. To this aim, it advantageously comprises second storage capacitors 71 (preferably of the electrolytic type) electrically connected in parallel to the terminals 60, 70.

The conversion stage 6 provides a second charging current I2 to the storage stage 7 to charge the storage capacitors 71, when it is electrically connected to the storage stage 4 by the switching stage 5.

When the conversion stage 6 is electrically connected to the storage stage 4, the storage stage 7 is maintained charged by the conversion stage 6 and the supply voltage VS2 is equal to the voltage V3.

When it is electrically disconnected from the storage stage 4, the conversion stage 6 does not operate and the supply voltage VS2 at the terminals 70 decreases, as the storage stage 7 progressively discharges.

Preferably, the storage stage 7 comprises a third blocking circuit 72 to prevent the circulation of a discharging current from the storage capacitors 71 towards the conversion stage 6 due to the presence of possible capacitive load unbalances.

Preferably, the blocking circuit 72 comprises one or more diodes suitably configured to block such a discharging current.

According to a preferred embodiment of the invention, the power supply unit 1 comprises a second step-down conversion stage 8, which is electrically connected to the storage stage 7.

The conversion stage 8 is adapted to receive the supply voltage VS2 and provide at its output terminals 80 a fourth voltage V4 (preferably a DC voltage) having a lower amplitude than the voltage VS2 (e.g. 3.6 V in normal conditions).

Preferably, the conversion stage 8 comprises a second DC/DC switching converter, which is advantageously configured to convert the voltage VS2 into the lower voltage V4.

Preferably, said second switching converter is a buck converter.

Preferably, the second switching converter is a buck converter with a low quiescent current to reduce power consumption.

According to a preferred embodiment of the invention, the power supply unit 1 comprises a regulation stage 9 electrically connected to the conversion stage 8.

The regulation stage 9 is adapted to receive in input the voltage V4 and provide in output a fifth voltage V5 (preferably a DC voltage) having a lower amplitude than the voltage V4 (e.g. 3V).

Preferably, the regulation stage 9 is a DC linear voltage regulator that can operate with small differential voltages at the terminals 80, 90, such as a Low-Drop-Out (LDO) regulator.

Preferably, the regulation stage 9 comprises a regulator circuit 91 and third input and output filtering networks 92, 93 that are electrically connected to the regulator circuit 91 to provide voltage smoothing functions at suitable corresponding input and output pins of this latter.

According to a preferred embodiment of the invention, the power supply unit 1 comprises a second sensing circuit 12, which is electrically connected to the storage stage 7.

The sensing circuit 12 is advantageously adapted to provide second sensing signals S2 indicative of the supply voltage VS2 at the supply terminals 70.

Preferably, the sensing signals S2 are sent in input to a control unit 10, which provides the control signals C to the switching stage 5 in response to the sensing signals S2. Preferably, the control unit 10 is the control unit of the IED 100.

Preferably, the sensing circuit 12 comprises a second operational amplifier 121 and second conditioning circuits 122, 123 to set the operational amplifier 121 in a voltage-follower configuration providing a high-impedance decoupling between the supply terminals 70 and the output terminal 120 of the sensing circuit 12, at which the sensing signal S2 is made available.

The electronic stages 6, 7 (and possibly 8, 9, 12), described above, form the feeding section 700 of the power supply unit 1.

The feeding section 700 comprises a low voltage energy reservoir formed by the storage stage 7 (also in this case the term "low voltage" has to be intended with respect to the feed voltages normally feeding the IED 100).

The feeding section 700 can made available different supply voltages to the IED 100.

For example, the output voltages at each of the electronic stages 7, 8, 9 may be usefully employed to feed the IED 100.

Each of said feed voltages may be useful to feed corresponding electronic circuits of the IED 100.

As an example, the supply voltage VS2 may be useful to feed LED signalling circuits of the IED 100 whereas the voltage V5 may be useful to feed digital processing units present in the IED 100.

The feeding section 700 comprises the high voltage conversion stage 6 that charges the energy reservoir 7 by converting the energy made available by the high voltage energy reservoir 4, when this is necessary.

The feeding and harvesting sections 400, 700 of the power supply unit 1 can be electrically connected/disconnected one to another by the switching stage 5 in a selective manner.

The operation of the feeding section 700 is briefly described in the following.

Capacitors 71 are initially supposed to be fully discharged.

In this case the switching stage 5 is not actively controlled by control unit 10. Thus, the switching stage 5 is in an ON condition.

The conversion stage 6 receives the supply voltage VS1 and it is capable to drain electric power from the storage stage 4 and provide a charging current I2 to charge the storage stage 7.

The voltage VS2 at the terminals 70 of the storage stage 7 progressively increases until the storage stage 7 is fully charged.

The sensing circuit 12 continuously (i.e. at each sampling period of time) provides the control unit 10 with the sensing signals S2 indicative of the supply voltage VS2.

As soon as the supply voltage VS2 achieves a charging level VCH corresponding to a full charge condition of the storage stage 7, the control unit 10 provides control signals C to switch the switching stage 5 in an OFF condition.

In this case, the conversion stage 6 does not operate and the storage stage 7 is not charged by this latter.

As it provides electric power to the downstream electronic stages 8, 9, the power stage 7 discharges and the supply voltage VS2 progressively decreases.

Figure 6:
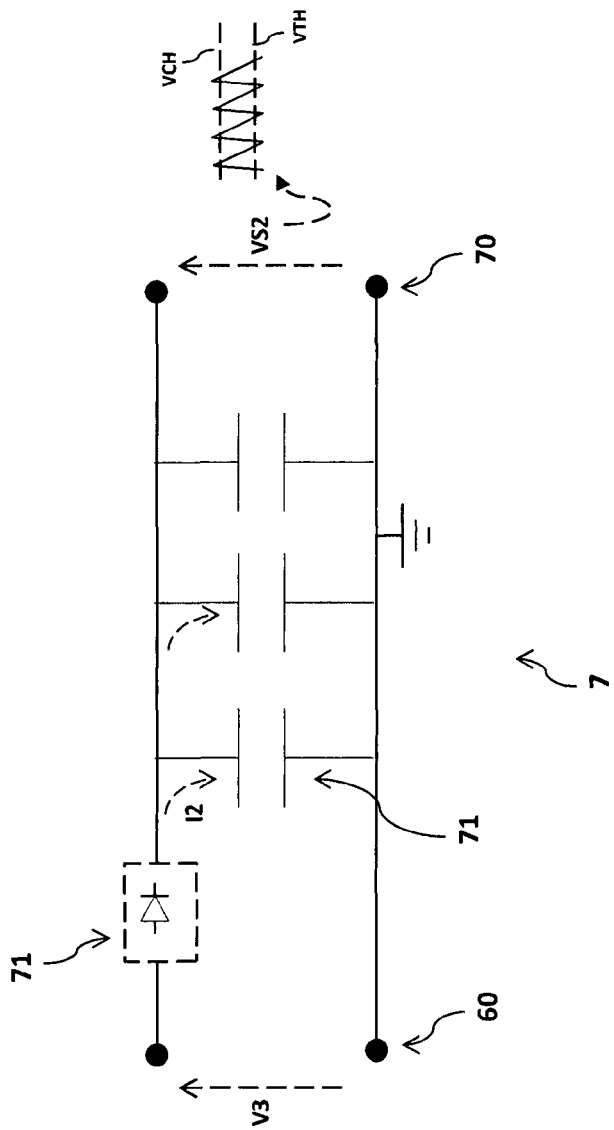
Figure 7:
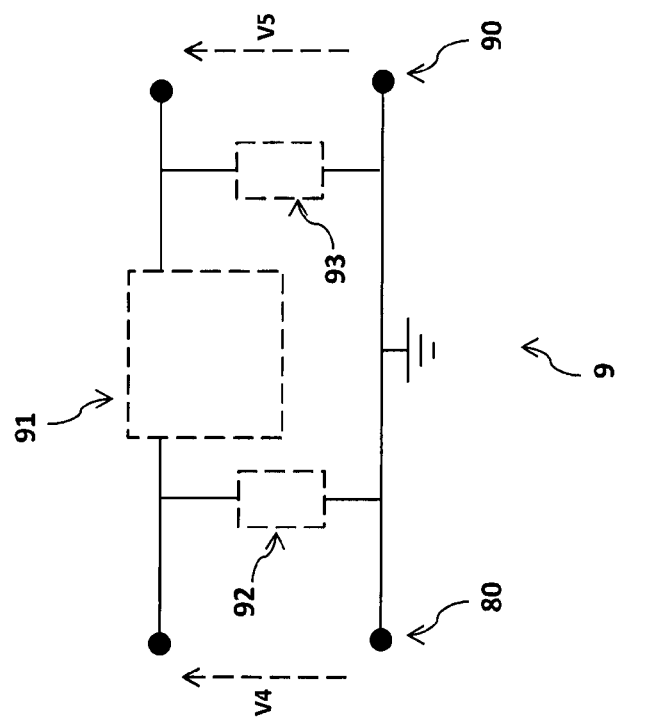
Figure 8:
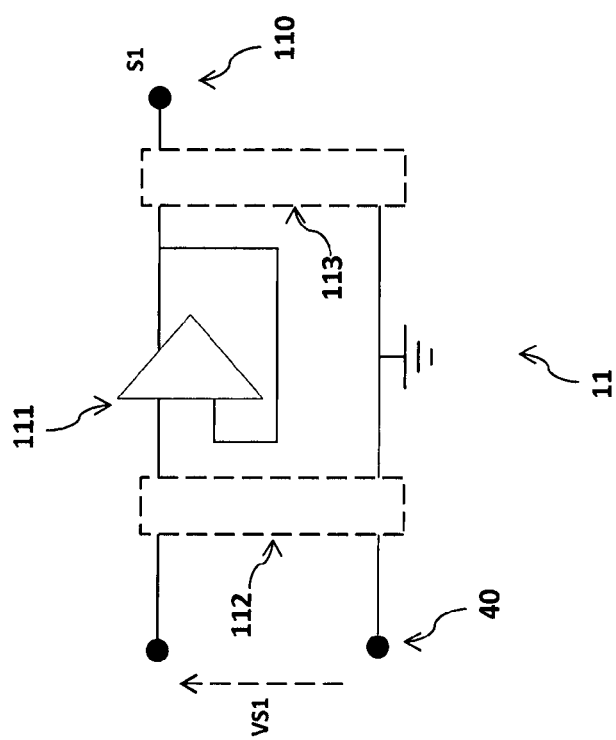

When the supply voltage VS2 becomes lower than a voltage threshold VTH, the control unit 10 provides the control signals C (or simply stops actively controlling the switching stage 5) to switch the switching device 51 in an ON condition again (FIG. 6).

From the above, it is apparent that that the switching stage 5 electrically connects the storage stage 4 with the conversion stage 6 only when the storage stage 7 is a discharged condition.

Figure 5:
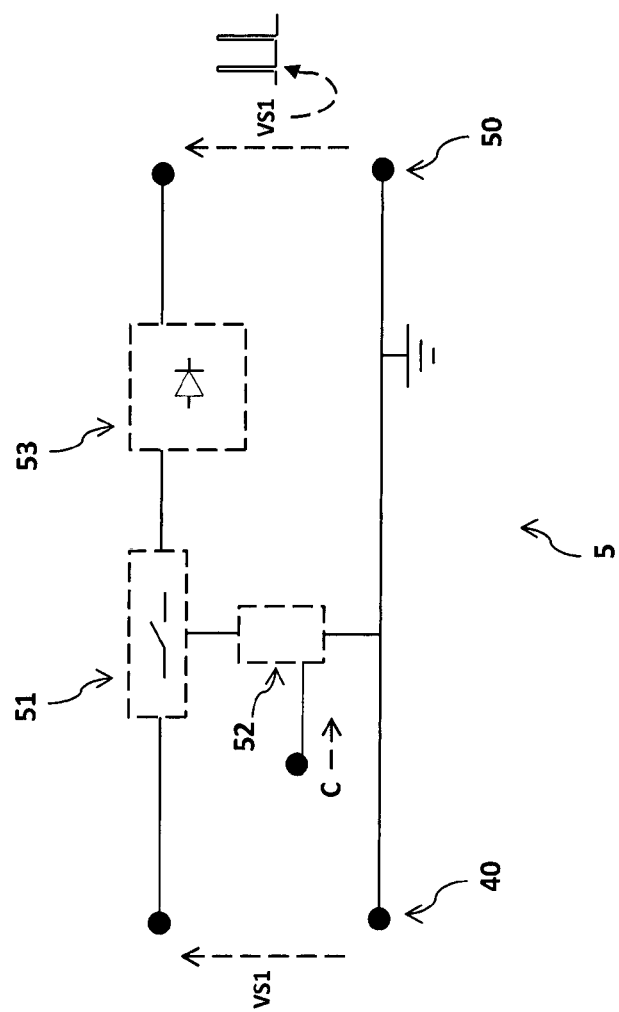

The conversion stage 6 receives in input pulses of supply voltage VS1 and it is operated in an intermittent manner (FIGS. 1 and 5). In practice, the switching converter 66 is activated with a duty-cycle corresponding to that one of the switching device 51.

Advantageously, the control unit 10 operates the switching device 51 with a very low duty-cycle (e.g. less than 10%).

In this way, the conversion stage 6 does not operate for most of the time (e.g. for 90% of the switching period of the switching device 51).

As a consequence, the supply voltage VS2 has substantially a triangular shape within the voltage levels VTH and VCH. The waveform of the voltage VS2 has voltage rising and decreasing segments. The duration of the voltage rising segments is advantageously quite shorter than the duration of the voltage decreasing segments (FIGS. 1 and 6).

This solution allows remarkably reducing the current leakages and the overall self-heating of the power supply unit 1.

Further, the electric energy stored in the storage stage 4 may be used more efficiently, which allows to supply the IED 100 for a longer time in case no useful electric power can be harvested from the feeding conductor 500.

The power supply unit 1 of the invention has a number of advantages with respect to similar units of known type.

The power supply unit 1 provides improved performances in terms of current consumption savings, particularly when the feeding conductor 500 is no capable to provide electric power.

This allows to remarkably extending the period of time in which the IED 100 can be operated in emergency conditions.

The power supply unit 1 has a smaller size and higher efficiency in comparison with commonly available solutions.

The power supply unit 1 has a relatively simple circuit structure, which is easy and cheap to manufacture at industrial level.

The invention claimed is:

1. A power supply unit for an Intelligent Electronic Device (IED) for LV or MV electric power applications comprising:
   a power transformer stage, which is operatively coupled to a feeding conductor to harvest electric power from said feeding conductor, said power transformer stage being adapted to provide a first voltage (V1);
   a first storage stage, which is electrically connected to said power transformer stage to receive said first voltage, said first storage stage being adapted to store electric energy and provide a first supply voltage (VS1), said power transformer stage being adapted to provide a first charging current (I1) to charge said first storage stage, when a current flows along said feeding conductor;
   a first step-down conversion stage including a DC/DC switching converter, said DC/DC switching converter structured to receive said first supply voltage (VS1) from a switching stage and provide a third voltage (V3) having a lower amplitude than said first supply voltage when said DC/DC switching converter is electrically connected with said first storage stage by way of the switching stage;
   a second storage stage, which is electrically connected to said first step-down conversion stage, said second storage stage being adapted to store electric energy and provide a second supply voltage (VS2), said first step-down conversion stage being adapted to provide a second charging current (I2) to charge said second storage stage, when said first step-down conversion stage is electrically connected to said first storage stage,
   wherein the switching stage includes a switching device structured to electrically connect/disconnect said DC/DC switching converter with/from said first storage stage and a driving circuit adapted to receive control signals (C) from a control unit and enable/disable the switching operation of said switching device in response to control signals (C) received in input, the switching stage being structured and operable so that during a start-up event when the control signals (C) are unavailable from the control unit and not received by the driving circuit, the driving circuit turns the switching device on to thereby connect said DC/DC switching converter with said first storage stage, and
   wherein the control unit operates the switching device using a first duty cycle of less than 10% while the control unit operates the DC/DC switching converter using a second duty cycle greater than the first duty cycle.

2. The power supply unit, according to claim 1, which further comprises a second step-down conversion stage, which is electrically connected to said second storage stage, said second step-down conversion stage being adapted to receive said second supply voltage (VS2) and provide a fourth voltage (V4) having a lower amplitude than said second supply voltage.

3. The power supply unit, according to claim 2, which further comprises a regulation stage, which is electrically connected to said second step-down conversion stage, said regulation stage being adapted to receive in input said fourth voltage (V4) and provide a fifth voltage (V5) having a lower amplitude than said fourth voltage.

4. The power supply unit, according to claim 3, which further comprises a first sensing circuit, which is electrically connected to said first storage stage, said first sensing circuit being adapted to provide first sensing signals (S1) indicative of said first supply voltage (VS1).

5. The power supply unit, according to claim 2, which further comprises a first sensing circuit, which is electrically connected to said first storage stage, said first sensing circuit being adapted to provide first sensing signals (S1) indicative of said first supply voltage (VS1).

6. The power supply unit, according to claim 1, which further comprises a first sensing circuit, which is electrically connected to said first storage stage, said first sensing circuit being adapted to provide first sensing signals (S1) indicative of said first supply voltage (VS1), said first sensing circuit including a first conditioning circuit, a second conditioning circuit, and an operational amplifier arranged in a voltage-follower configuration.

7. The power supply unit, according to claim 6, which further comprises a second sensing circuit, which is electrically connected to said second storage stage, said second sensing circuit being adapted to provide second sensing signals (S2) indicative of said second supply voltage (VS2).

8. The power supply unit, according to claim 7, wherein said first and second sensing circuits provide said first and second sensing signals to said control unit.

9. The power supply unit, according to claim 8, wherein said switching stage receives control signals (C) that are provided by said control unit in response to said second sensing signals.

10. The power supply unit, according to claim 1, wherein said power transformer stage comprises a current transformer operatively coupled to said feeding conductor.

11. The power supply unit, according to claim 10, wherein said power transformer stage comprises a voltage limiting circuit electrically connected to said current transformer, said voltage limiting circuit providing protection against voltage pulses.

12. The power supply unit, according to claim 11, wherein said power transformer stage comprises a step-up circuit, which is electrically connected to said voltage limiting circuit, said step-up circuit being adapted to receive an intermediate voltage (VT) from said voltage limiting circuit and provide said first voltage (V1) having a higher amplitude than said intermediate voltage.

13. The power supply unit, according to claim 12, wherein said step-up circuit comprises a voltage doubler circuit to step-up and rectify the intermediate voltage (VT) provided by said voltage limiting circuit.

14. The power supply unit, according to claim 11, wherein said power transformer stage comprises a rectification circuit to rectify an intermediate voltage (VT) provided by said voltage limiting circuit.

15. The system of claim 1 further comprises a second sensing circuit adapted to provide second sensing signals (S2) indicative of said second supply voltage (VS2) to the control unit,
wherein the control unit is adapted to transmit control signals (C) effective to turn on the switching device in response to the second supply voltage (VS2) being less than a first voltage threshold, and
wherein the control unit is adapted to transmit control signals (C) effective to turn off the switching device in response to the second supply voltage (VS2) corresponding to a full charge condition of said second storage stage.

16. The system of claim 1, wherein the switching stage includes a diode coupled between the switching device and the first step-down conversion stage, the diode being configured to block a discharging current from the first step-down conversion stage.

17. An apparatus comprising: an Intelligent Electronic Device (IED) for a LV or MV electric power applications, the IED including a power supply unit having:
a power transformer stage, which is operatively coupled to a feeding conductor to harvest electric power from said feeder conductor, said transformer stage being adapted to provide a first voltage (V1);
a first storage stage, which is electrically connected to said power transformer stage to receive said first voltage, said first storage stage being adapted to store electric energy and provide a first supply voltage (VS1), said power transformer stage being adapted to provide a first charging current (I1) to charge said first storage stage, when a current flows along said feeding conductor;
a first step-down conversion stage including a DC/DC switching converter, said DC/DC switching converter structured to receive said first supply voltage (VS1) from a switching stage and provide a third voltage (V3) having a lower amplitude than said first supply voltage when said DC/DC switching converter is electrically connected with said first storage stage by way of the switching stage;
a second storage stage, which is electrically connected to said first step-down conversion stage, said second storage stage being adapted to store electric energy and provide a second supply voltage (VS2), said first step-down conversion stage being adapted to provide a second charging current (I2) to charge said second storage stage, when said first step-down conversion stage is electrically connected to said first storage stage,
wherein the switching stage includes a switching device structured to electrically connect/disconnect said DC/DC switching converter with/from said first storage stage and a driving circuit adapted to receive control signals (C) from a control unit and enable/disable the switching operation of said switching device in response to control signals (C) received in input, the switching stage being structured and operable so that if the control signals (C) are not available during a start-up event when the control signals (C) are unavailable from the control unit and the driving circuit does not receive the control signals (C) from the control unit, the driving circuit naturally turns the switching device to an ON to connect said DC/DC switching converter with said first storage stage, and
wherein the control unit operates the switching device using a first duty cycle of less than 10% while the control unit operates the DC/DC switching converter using a second duty cycle greater than the first duty cycle.

18. The apparatus, according to claim 17, which further comprises a second step-down conversion stage, which is electrically connected to said second storage stage, said second step-down conversion stage being adapted to receive said second supply voltage (VS2) and provide a fourth voltage (V4) having a lower amplitude than said second supply voltage.

19. The apparatus, according to claim 18, which further comprises a regulation stage, which is electrically connected to said second step-down conversion stage, said regulation stage being adapted to receive in input said fourth voltage (V4) and provide a fifth voltage (V5) having a lower amplitude than said fourth voltage.

20. The apparatus, according to claim 17, which further comprises a first sensing circuit, which is electrically connected to said first storage stage, said first sensing circuit being adapted to provide first sensing signals (S1) indicative of said first supply voltage (VS1).

* * * * *